No. 763,611. Patented June 28, 1904.

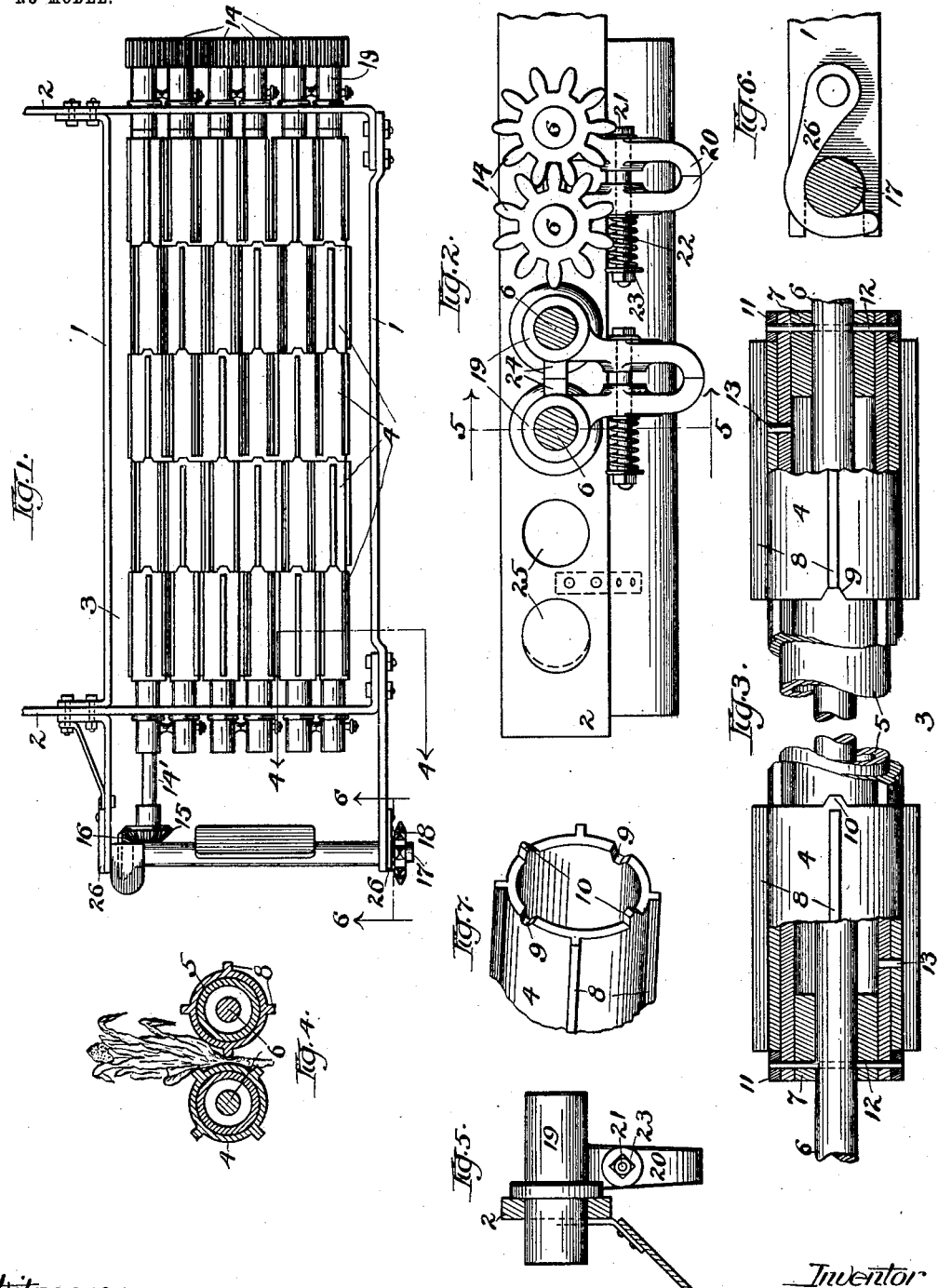

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS.

HUSKING-ROLLER FOR CORN-HUSKING MACHINES.

SPECIFICATION forming part of Letters Patent No. 763,611, dated June 28, 1904.

Application filed April 7, 1904. Serial No. 201,943. (No model.)

*To all whom it may concern:*

Be it known that I, EDWARD A. JOHNSTON, a citizen of the United States, residing at Chicago, in the county of Cook and State of Illinois, have invented a new and useful Improvement in Husking-Rollers for Corn-Husking Machines, of which the following is a complete specification.

This invention is applicable to any style of corn-husking machines, whether in connection with a machine which shreds and husks corn and fodder or whether in connection with a machine which gathers the ears from the standing stalks and husks them, but is more particularly applicable to the latter class, because of the lightness of construction desirable in such machines.

One of the chief difficulties encountered in corn gathering and husking machines lies in the fact that a considerable quantity of stalks adhere to the ears, so that it becomes necessary to remove these fragments of stalks as well as the husks from the ears. A husking-roller well adapted to engage the husks of the ears will often fail to engage a cornstalk when lying longitudinally with respect to the roller.

The object of this invention is to provide light rollers which will be sufficiently aggressive to enable them to remove the stalks and other trash as well as the husks from the ears without crushing the ears themselves.

Referring to the drawings, Figure 1 represents a plan view of a set of husking-rollers mounted in a frame which for convenience may be regarded as a portion of a frame of a corn picker and husker. Fig. 2 is an enlarged elevation of the upper or right-hand side of same. Fig. 3 is an enlarged detail view, partly in section, of a portion of an individual husking-roller, showing the interlocking feature of the sections forming same, also the pipe upon which it is mounted, the sleeves supporting the pipe, and the main supporting-shaft. Fig. 4 is a transverse section of two coöperating husking-rollers, showing the butt-end of an ear of corn when in engagement therewith, the section being taken as indicated by the line 4 4 in Fig. 1. Fig. 5 is a section taken through the supporting member of the upper ends of the husking-rollers as indicated by the line 5 5 in Fig. 2. Fig. 6 is an elevation of a portion of the parts shown in Fig. 1 and taken as indicated by the line 6 6 in said figure, illustrating the manner of releasably securing the transverse driving-shaft to the frame in which is mounted the husking-rollers; and Fig. 7 is a perspective view of the end of one of the sections forming the husking-roller, showing the interlocking recesses and projections thereon.

Referring to the drawings, 1 designates the longitudinal, and 2 the transverse, member constituting the frame in which the husking-rollers 3 are mounted. These husking-rollers are comprised each of a series of interlocking sections, as 4, mounted upon a pipe or tube 5, extending the full length of the said roller. This pipe 5 is supported and rigidly secured to the husking-roller shaft 6, which extends a sufficient distance at either end beyond the sections 4 of the husking-roller to afford bearing and driving means for same. Since the diameter of the shaft 6 is considerably less than the bore of the pipe 5, the sleeves 7 are interposed therebetween to hold the pipe securely to and concentric with the said driving-shaft.

The individual sections 4 of the husking-rollers are provided with a plurality of longitudinally-extending ribs 8, and on the ends of said sections are formed the recesses 9 to receive the corresponding projections 10 on the abutting sections. The end of each section is provided, preferably, with two recesses and two projections uniformly disposed, as shown in Fig. 7, so that the sections are rendered interchangeable in every respect. By having the interlocking sections mounted upon a pipe extending the full length of the rollers the rollers are made not only light, but very strong, as the pipe strengthens the rollers beneath the joints of the sections. Longitudinal movement of the interlocked sections may be prevented by any suitable means—such, for instance, as the collars 11, which are secured to the pipe 5 by means of the pins 12. These pins 12 are also shown as securing the sleeves 7 to the shaft 6. Relative rotative movement between the interlocking sections and the supporting-pipe 5 is prevented by the pins 13. The several sections are provided with a corresponding number of ribs and are so arranged that the ribs on each section are staggered with respect to the ribs of the adjacent sections, thus forming in each roller considered as a whole a series of longitudinally-extending interrupted ribs. The effect of this will be to interrupt the free passage of the material operated upon in passing thereover and also to afford a greater number of opportunities for each stalk or ear to become engaged with the ends of the ribs, thus making the rollers more aggressive in their action. The rollers (six being shown in this instance) are driven from their upper ends by means of the intermeshing pinions 14, the shaft 14' of one of the side rollers being extended and provided on its lower end with a bevel-pinion 15, which engages a corresponding pinion 16 on the driving-shaft 17. To the sprocket-wheel 18 on the end of this driving-shaft 17 is connected suitable driving mechanism operated from any moving part of the machine.

The ends of the husking-roller shaft 6 are supported in bearings 19, which are provided with downwardly-extending arms 20, as shown in Figs. 2 and 5. These bearings, with their downwardly-extending arms, are arranged in pairs, one arm of each pair being provided with a bolt 21, which projects through an aperture in the opposing arm and supports a spring 22 on the projecting end of the bolt. This spring 22 reacts between the adjacent arm and the nut and washer 23 on the end of said bolt, thus exerting a pressure which tends to hold the rollers mounted in the bearings in contact. The downwardly-projecting ends of the opposing arms are provided with curved ends, which impinge each other and form a fulcrum about which one of said rollers moves. The lugs 24 on the bearings hold the rollers at a suitable distance apart. One of each of the pairs of apertures 25 in the transverse member 2, which engage the bearings 19, is made slightly larger than the diameter of the bearing which it engages, thus admitting of a slight lateral movement of the husking-roller when the passage of stalks or husks between the said rollers make such movement necessary.

The driving-shaft 17 is releasably secured in its bearing by means of the latches 26, as shown in Fig. 6 and in plan view in Fig. 1.

By making the rollers of the cross-section shown they are rendered aggressive, as before described, but will not crush the ears of corn, and hence can be quite light, because of the small diameter and peculiar construction.

What I claim as my invention, and desire to secure by Letters Patent, is—

1. A husking-roller comprised of a main supporting-shaft, sleeves rigidly secured thereto at positions near the ends of said shaft, a pipe or tube extending substantially the full length of the said roller mounted upon and secured to said sleeves, a plurality of interlocking roller-sections sleeved upon said pipe or tube and rigidly secured thereto, and a series of longitudinally-extending ribs on the surface of each of the said roller-sections the individual ribs of each of the said series being laterally disposed or staggered with respect to the ribs on the roller-sections adjacent thereto, substantially as described.

2. A husking-roller comprised of a main supporting-shaft, a plurality of interlocking roller-sections mounted thereon and secured thereto, and a series of longitudinally-extending ribs on the surface of each of said roller-sections, the ribs of each of the said series extending the full length of the sections and having the width of the spaces therebetween largely exceeding their own width, while the ribs of the several sections are alternately disposed or staggered with respect to the ribs on the roller-sections adjacent thereto, substantially as and for the purpose set forth.

EDWARD A. JOHNSTON.

Witnesses:
GEORGE W. HENDERSON,
J. C. WARNES.